United States Patent [19]

Strange

[11] Patent Number: 5,069,481

[45] Date of Patent: Dec. 3, 1991

[54] GOLF CART CLUB RACK AND METHOD

[76] Inventor: William M. Strange, 12514 Eveningside Dr., Sun City West, Ariz. 85375

[21] Appl. No.: 562,825

[22] Filed: Aug. 6, 1990

[51] Int. Cl.$^5$ .......................... B60R 9/06; B60R 9/08
[52] U.S. Cl. ........................... 280/769; 280/DIG. 5; 211/70.2; 224/274; D12/16
[58] Field of Search ................ 180/908; 280/DIG. 5, 280/769, DIG. 6, 47.26; 211/70.1, 70.2, 70.5; 224/274; D12/16; 248/96; D34/15

[56] References Cited

U.S. PATENT DOCUMENTS

| D. 185,753 | 7/1959 | Jensen | 280/DIG. 5 X |
|---|---|---|---|
| 2,064,433 | 12/1936 | Kronthal | 211/70.2 |
| 2,761,691 | 9/1956 | George | 211/70.2 X |
| 3,042,443 | 7/1962 | Laher | 248/96 X |
| 3,360,279 | 12/1967 | Hunt | 280/DIG. 6 X |
| 3,608,659 | 9/1971 | Gardner | 280/DIG. 5 X |
| 3,709,553 | 1/1973 | Churchill et al. | 280/DIG. 5 X |
| 3,854,641 | 12/1974 | Kohls | 211/70.5 X |
| 4,061,257 | 12/1977 | St. Clair | 211/70.2 X |
| 4,098,536 | 7/1978 | Mills | 280/DIG. 5 X |
| 4,227,710 | 10/1980 | Laub | 280/47.19 |
| 4,334,692 | 6/1982 | Lynch | 280/DIG. 5 X |
| 4,522,281 | 6/1985 | Snider | 280/DIG. 5 X |
| 4,533,013 | 8/1985 | Hightower | 280/DIG. 5 X |
| 4,773,695 | 9/1988 | Jones et al. | 280/DIG. 5 X |
| 4,785,980 | 11/1988 | Redick | 211/70.5 X |
| 4,795,205 | 1/1989 | Gerber | 280/DIG. 5 X |
| 4,830,037 | 5/1989 | Held | 280/DIG. 5 X |

Primary Examiner—Andres Kashnikow
Assistant Examiner—Brian L. Johnson
Attorney, Agent, or Firm—Harry M. Weiss

[57] ABSTRACT

A golf cart club rack device and method for carrying and securing a set of golf clubs on the rear portion of the golf cart. The rack has a horizontal upper panel having selectively spaced holes with vertical plastic tubes for positioning the clubs in a selective order. The rack also has a horizontal lower panel having similarly spaced recesses vertically aligned below the holes and tubes for holding the tubes at the bottom thereof. Quick-connect grip connectors adjustably connect the horizontal upper panel to two, rear-mounted, vertical, L-shaped posts. A two-piece transparent plastic cover is hinged to the horizontal upper panel and is latched to an upper extension of the two L-shaped posts.

6 Claims, 1 Drawing Sheet

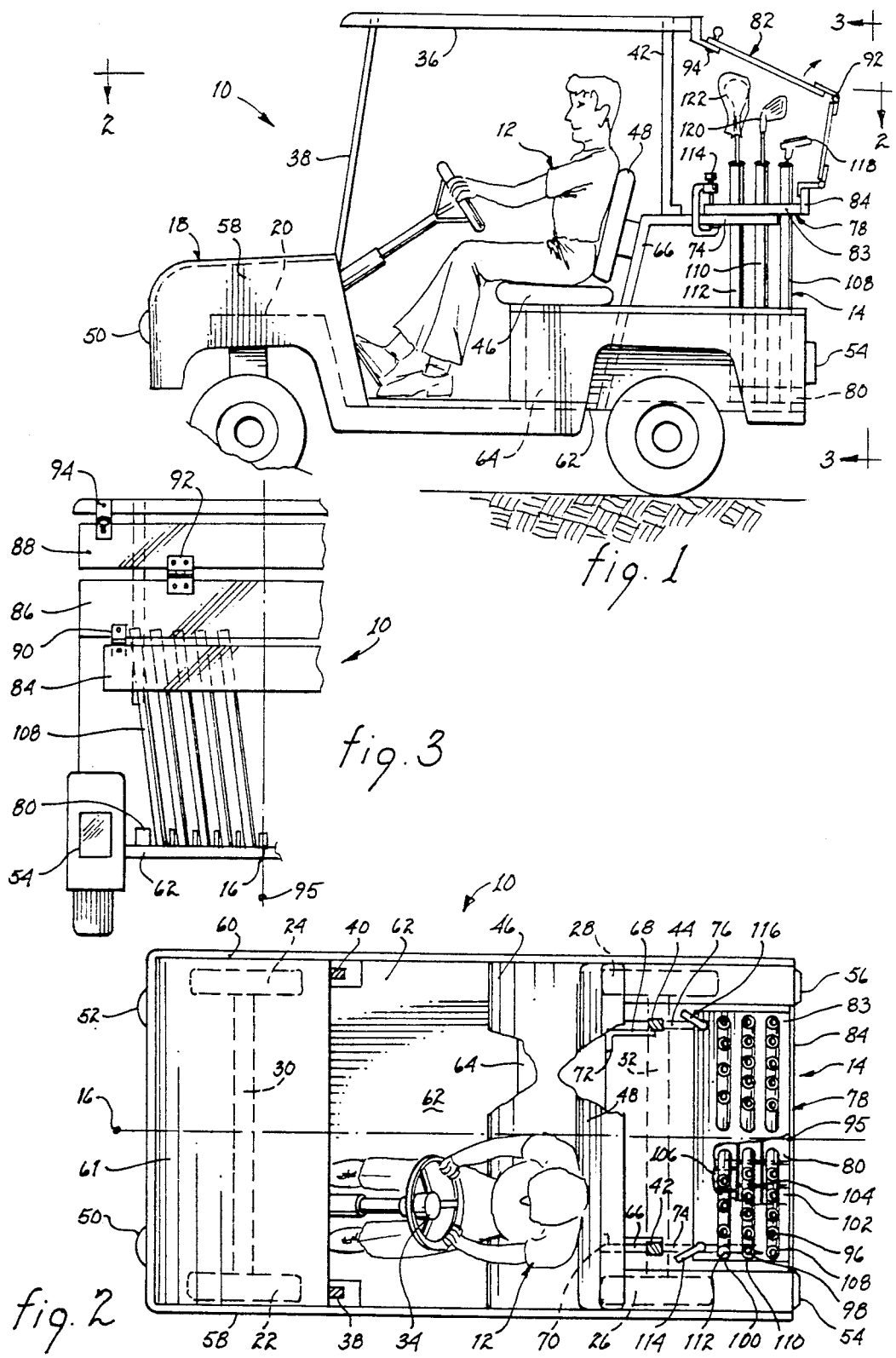

GOLF CART CLUB RACK AND METHOD

BACKGROUND OF THE INVENTION

1. Field of the Invention

This invention generally relates to a golf cart club rack and method, and in particular, the invention relates to a golf cart club rack and method which has a rear-mounted, removable, horizontal panel that has a plurality of selectively located vertical tubes for a set of golf clubs and that has an adjustable-height, foldable, transparent cover.

2. Description of the Prior Art

A prior art golf cart club rack is described in U.S. Pat. No. 4,533,013, issued Aug. 6, 1985. Related patents include U.S. Pat. Nos.:

2,761,691, issued Sept. 4, 1956
3,608,659, issued Sept. 28, 1971,
4,227,710, issued Oct. 14, 1980, and
4,334,692, issued June 15, 1982.

The prior art golf cart club rack includes vertical posts mounted on a golf cart body rear portion, and horizontal supports fixedly connected to the vertical posts wherein, the horizontal supports having a pair of straps for holding a golf bag with golf clubs.

One problem with the prior art golf cart club rack is that the rack is not easily removed from the golf cart. Another problem with the prior art golf cart club rack is that there is no rain protection to protect the golf bag and its clubs.

SUMMARY OF THE INVENTION

According to the present invention, a golf cart club rack is provided. This rack comprises vertical support means which is mounted on a golf cart body, horizontal panel means which has quick-release connectors that are coupled to the vertical support means and which has a plurality of selectively located openings that have respective vertical tubes for a set of golf clubs, and an adjustable height, foldable, transparent cover which is disposed over the horizontal panel means.

By using horizontal panel means with quick-release, connectors, the problem of not easily removing the rack from the cart is avoided. By using the adjustable height, foldable, transparent cover, the problem of not having a rain protector over the golf clubs is avoided.

The foregoing and other objects, features and advantages will be apparent from the following description of the preferred embodiment of the invention as illustrated in the accompanying drawings.

BRIEF DESCRIPTION OF THE DRAWINGS

FIG. 1 is a side elevation view of a golf cart club rack according to the invention;

FIG. 2 is a plan view as taken along line 2—2 of FIG. 1; and

FIG. 3 is a partial rear elevation view as taken along line 3—3 of FIG. 1.

DESCRIPTION OF THE PREFERRED EMBODIMENT

As shown in FIGS. 1, 2 and 3, a golf cart 10 is provided. Cart 10, which has a driver 12, includes a club rack or assembly 14, which is symmetrically disposed about a golf cart centerline 16.

Cart 10 has a body 18, which has frame or weldment 20; and has four wheels 22, 24, 26, 28 with front and rear axles 30, 32. Cart 10 also has a steering wheel 34, and also has a roof 36 that has roof supports 38, 40, 42, 44. Cart 10 also has a seat 46 and a back rest 48; and also has four lights 50, 52, 54, 56.

Body 18 has left and right side panels 58, 60, and has a front hood 61. Body 18 also has a floor plate or welding unit 62, which is welded to frame 20, and which is fixedly connected or welded to side panels 58, 60. Body 18 also has a seat support unit 64.

Rack 14 has left and right posts 66, 68, which support back rest 48, and which have respective brackets 70, 72 that are connected to seat support unit 64. Posts 66, 68 have respective cantilever beams 74, 76, which respectively support roof supports 42, 44. Rack 14 also has an L-shaped upper panel 78, which is supported by cantilever beams 74, 76; and has a lower panel 80, which is supported by floor plate 62; and has a foldable, two-piece cover 82. Upper panel 78 has a horizontal portion 83, and a vertical transparent portion 84 which is fixedly connected to horizontal portion 83 along its bottom edge.

Cover 82 has a bottom transparent plate 86, and a top transparent plate 88. Plates 86, 88 are made of a plastic material. Bottom plate 86 has lower hinge means 90. Top plate 88 has a lower hinge means 92 and an upper latch means 94. Cover 82 preferably has VELCRO (loop or hook) type materials or any other holding device preferably on the outer surface thereof (not shown) which can be attached to one or more (preferably two) vertical supports (not shown) which have matching VELCRO (hook or loop) type material located on the outside of the vertical supports so that, when the cover 82 is swung back and lowered to its lowest position to provide access to the golf clubs, the cover 82 can be held down and will not be bounced around during golf cart use. Thus, the cover 82 can be swung to an upper locking position to secure the clubs as shown in FIG. 1 or lowered to permit access to the golf clubs during golf play. Rack 14 is symmetrical about a vertical reference centerline 95, which is normal to centerline 16, as shown in FIG. 3.

Upper panel 78 has ten outer holes 96, and ten middle holes 98 and eight inner holes 100 for two sets of golf clubs, where each set has ten iron clubs and four wood clubs. One person can position his or her clubs on one side of centerline 95; and the other person can position her clubs on the other side of centerline 95.

Lower panel 80 has ten outer recesses 102 which are vertically aligned with respective holes 96; and has ten middle recesses 104 which are vertically aligned with respective holes 98; and has eight inner recesses 106 which are vertically aligned with holes 100. Preferably, the tubes on the right side (looking at the cart from the rear) are tilted (see FIG. 2) so that the upper portions of each of those tubes are tilted to the right whereas the tubes on the left side are tilted so that the upper portions of each of those tubes are tilted to the left. This tilting of the tubes is advantageous for preventing the tubes from being accidentally lifted out of a locking position at the bottom thereof when a person withdraws golf clubs.

Outer holes 96 and recesses 102 have respective outer plastic tubes 108. Middle holes 98 and recesses 104 have respective middle plastic tubes 110. Inner holes 100 and recesses 106 have respective inner plastic tubes 112.

Upper panel 78 also has screw-type grips or connector 114, 116 which respectively connect to cantilever beams 74, 76. Connector 114, 116 are quick-connect and quick release type connectors.

The advantages of golf cart club rack 14 are indicated hereafter.

A) Clubs 118, 120, 122 can be kept in a numbered sequence so that clubs are easily removed and replaced and are kept in a selective order.

B) Latch means 94 can be locked so that cover 82 can be locked in place over clubs 118, 120, 122 for preventing theft of clubs.

C) Adjustable height cover 82 and adjustable upper panel 78 can be positioned to fit various types of golf carts.

D) Adjustable upper panel 78 can be transversely offset from lower panel 80 thereby locking tubes 108, 110, 112 in place.

E) Upper panel 78 and connectors 114, 116 permit a quick assembly or disassembly of rack 114 from cantilever beams 74, 76.

F) Two-piece cover 82, which is made of transparent plastic sheets or plates, provides ease of visibility of the region behind cart 10.

G) Two-piece cover 82 provides an adjustable slope to cover 82 thereby preventing a theft of the clubs when cover 82 is locked.

H) Two-piece cover 82 provides a rain protector for clubs 118, 120, 122, when cover 82 is in a closed position.

I) Latch means 94 permits the use of a conventional lock-type latch for ease of securing clubs 118, 120, 122.

While the invention has been described in its preferred embodiment, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. A golf cart club-rack for connection to a vertical rear-mounted support means of a golf cart body comprising:
   a horizontal upper panel coupled to the vertical support means and having a plurality of openings;
   adjustable connector means coupling the horizontal upper panel to the vertical support means;
   a plurality of vertical tubes extending through respective openings provided by said plurality of openings and supported by the horizontal upper panel for holding a set of golf clubs; and
   a foldable, multi-piece cover coupled to said horizontal upper panel and disposed over the clubs and tubes and horizontal upper panel; said cover includes:
   a bottom transparent plate having lower hinge means disposed along a lower edge thereof; a vertical transparent portion for interconnecting the lower hinge means to the horizontal upper panel; and
   a top transparent plate having lower hinge means disposed along a lower edge thereof and connected to the bottom transparent plate;
   said top transparent plate having latch means disposed along a top edge thereof.

2. The rack of claim 1 including:
   a lower panel having a plurality of recesses respectively aligned with the plurality of openings and respectively receiving the plurality of tubes.

3. The rack of claim 1 wherein
   the vertical, rear-mounted, support means includes:
   first and second spaced posts being mounted on the golf cart body;
   said first and second spaced posts having respective first and second cantilever beams extending horizontally therefrom and supporting the horizontal upper panel.

4. A method of storing a set of golf clubs on a rear portion of a golf cart, including the steps of:
   forming a horizontal upper panel having a plurality of vertical tubes extending respectively through a plurality of vertical holes in the horizontal upper panel;
   coupling the horizontal upper panel to a vertical support means mounted on the rear portion of the golf cart using a plurality of adjustable connector grips therebetween; and
   forming a horizontal lower panel having a plurality of vertical recesses;
   mounting the lower panel on the rear portion of the golf cart having the recesses respectively aligned with respect to said tubes;
   providing a foldable, two-piece cover having a bottom transparent plate with a bottom hinge means and having a top transparent plate with a bottom hinge means connected to the bottom transparent plate and with a top lock-type latch means;
   coupling the bottom hinge means of the bottom transparent plate to the horizontal upper panel through an interconnected vertical transparent portion; and
   coupling the top lock-type latch means to a roof structure.

5. A golf cart club-rack for connection to a vertical mounted support means of a golf cart body comprising:
   a horizontal upper panel coupled to the vertical support means and having a plurality of openings;
   a plurality of tubes each extending at an angle through a respective opening provided by said plurality of openings;
   a lower panel having recess means for holding a bottom portion of each one of said plurality of tubes at said angle to lock said tubes and to prevent accidental lifting of said tubes away from said lower panel; and a foldable cover means located above the horizontal upper panel interconnected between the golf cart body the horizontal upper panel for permitting access to the plurality of tubes.

6. The rack of claim 5 wherein a portion of said plurality of tubes being tilted at an angle to the right and another portion of said plurality of tubes being tilted at an angle to the left relative to a vertical plane through the rack.

* * * * *